United States Patent
Minami (10) Patent No.: US 12,522,707 B2
(45) Date of Patent: Jan. 13, 2026

(54) METHOD FOR PRODUCING POLY(3-HYDROXYALKANOATE) FOAM PARTICLES AND METHOD FOR PRODUCING POLY(3-HYDROXYALKANOATE) FOAM MOLDED ARTICLE

(71) Applicant: KANEKA CORPORATION, Osaka (JP)

(72) Inventor: Tetsuya Minami, Settsu (JP)

(73) Assignee: KANEKA CORPORATION, Osaka (JP)

( * ) Notice: Subject to any disclaimer, the term of this patent is extended or adjusted under 35 U.S.C. 154(b) by 494 days.

(21) Appl. No.: 18/044,625

(22) PCT Filed: Sep. 9, 2021

(86) PCT No.: PCT/JP2021/033161
§ 371 (c)(1),
(2) Date: Mar. 9, 2023

(87) PCT Pub. No.: WO2022/054870
PCT Pub. Date: Mar. 17, 2022

(65) Prior Publication Data
US 2023/0331950 A1    Oct. 19, 2023

(30) Foreign Application Priority Data
Sep. 11, 2020    (JP) .................... 2020-152730

(51) Int. Cl.
*C08J 9/18* (2006.01)
*C08G 63/06* (2006.01)
*C08J 9/12* (2006.01)
*C08K 5/14* (2006.01)
*C08G 101/00* (2006.01)

(52) U.S. Cl.
CPC ............... *C08J 9/18* (2013.01); *C08G 63/06* (2013.01); *C08J 9/122* (2013.01); *C08K 5/14* (2013.01); *C08G 2101/00* (2013.01); *C08G 2230/00* (2013.01); *C08J 2201/026* (2013.01); *C08J 2201/03* (2013.01); *C08J 2203/06* (2013.01); *C08J 2300/16* (2013.01); *C08J 2367/04* (2013.01)

(58) Field of Classification Search
CPC ........ C08J 9/18; C08J 9/122; C08J 2201/026; C08J 2201/03; C08J 2203/06; C08J 2300/16; C08J 2367/04; C08J 2201/034; C08J 9/0061; C08J 2467/04; C08G 63/06; C08G 2101/00; C08G 2230/00; C08K 5/14; B29C 44/3461; C08L 67/04
See application file for complete search history.

(56) References Cited

U.S. PATENT DOCUMENTS

2009/0149560 A1*  6/2009  Miyagawa .......... B29C 44/3461
                                                        521/59
2009/0197982 A1    8/2009  Miyagawa et al.
2020/0354539 A1*  11/2020  Minami .................... C08J 9/16

FOREIGN PATENT DOCUMENTS

WO    WO 2007/049694 A1    5/2007
WO    WO-2019146555 A1 *   8/2019    .............. C08J 9/232

OTHER PUBLICATIONS

International Search Report mailed on Oct. 19, 2021 in PCT/JP2021/033161 filed on Sep. 9, 2021, 3 pages.

* cited by examiner

*Primary Examiner* — K. Boyle
(74) *Attorney, Agent, or Firm* — Oblon, McClelland, Maier & Neustadt, L.L.P.

(57) ABSTRACT

Poly(3-hydroxyalkanoate) foam particles are obtained by: introducing a blowing agent into an aqueous dispersion in a pressure-resistant vessel, the aqueous dispersion containing a crosslinking agent and resin particles containing a poly(3-hydroxyalkanoate); heating the contents of the pressure-resistant vessel to a given temperature in a range of 130 to 150° C.; holding the contents of the pressure-resistant vessel at the given temperature for 5 to 55 minutes; and opening one end of the pressure-resistant vessel to discharge the contents of the pressure-resistant vessel into a low-pressure atmosphere and foam the resin particles. The poly(3-hydroxyalkanoate) is a mixture containing a poly(3-hydroxyalkanoate) copolymer and a poly(3-hydroxybutyrate) homopolymer at a weight ratio of 99:1 to 80:20, and the crosslinking agent is an organic peroxide which is a percarbonate.

20 Claims, 1 Drawing Sheet

METHOD FOR PRODUCING POLY(3-HYDROXYALKANOATE) FOAM PARTICLES AND METHOD FOR PRODUCING POLY(3-HYDROXYALKANOATE) FOAM MOLDED ARTICLE

CROSS-REFERENCE TO RELATED APPLICATIONS

The present application is a 35 U.S.C. § 371 national stage patent application of International patent application PCT/JP2021/033161, filed on Sep. 9, 2021, which is based on and claims the benefits of priority to Japanese Application No. 2020-152730, filed on Sep. 11, 2020. The entire contents of these applications are incorporated herein by reference.

TECHNICAL FIELD

The present invention relates to a method for producing poly(3-hydroxyalkanoate) foam particles by foaming resin particles made of a poly(3-hydroxyalkanoate) composition and a method for producing a poly(3-hydroxyalkanoate) foam molded article by molding the foam particles.

BACKGROUND ART

A huge amount of petroleum-based plastics are discarded as waste every year. The huge amount of waste plastics have brought about the problems of a shortage of landfill sites and environmental pollution, and these problems have become a serious concern. Additionally, in recent years, microplastics have caused significant harm to the marine environment. Against this background, increasing attention has been paid to biodegradable plastics which are degradable by the action of microorganisms in the environment such as the sea and earth, in landfill sites, and in compost. The development of biodegradable plastics has been pursued with the goal of applying them to a wide variety of products such as materials for agriculture, forestry, and fishery which are used in the environment and food containers, packaging materials, hygiene products, and garbage bags which are difficult to collect and recycle after use. Further, foams made of biodegradable plastics are promising for use in cushioning materials for packaging, boxes for agricultural products, boxes for fishes, automobile parts, materials for building construction, and materials for civil engineering.

Among biodegradable plastics as described above, poly (3-hydroxyalkanoates) (hereinafter also referred to as "P3HAs"), which are plant-derived plastics, are drawing attention in terms of high biodegradability and carbon neutrality. Among poly(3-hydroxyalkanoates), poly(3-hydroxybutyrate) (hereinafter also referred to as "P3HB"), poly(3-hydroxybutyrate-co-3-hydroxyvalerate) (hereinafter also referred to as "P3HB3HV"), poly(3-hydroxybutyrate-co-3-hydroxyhexanoate) (hereinafter also referred to as "P3HB3HH"), and poly(3-hydroxybutyrate-co-4-hydroxybutyrate) (hereinafter also referred to as "P3HB4HB") are attracting particular attention.

Researches have been conducted to use the above biodegradable plastics in foam products. For example, Patent Literature 1 discloses poly(3-hydroxyalkanoate) foam particles having a gel fraction and a heat of fusion within given ranges and a poly(3-hydroxyalkanoate) foam molded article produced using the poly(3-hydroxyalkanoate) foam particles.

Patent Literature 2 discloses poly(3-hydroxyalkanoate) resin foam particles made of a resin composition containing a poly(3-hydroxyalkanoate) and an isocyanate compound and having a melt viscosity equal to or higher than a given value.

CITATION LIST

Patent Literature

PTL 1: WO 2019/146555
PTL 2: WO 2007/049694

SUMMARY OF INVENTION

Technical Problem

Patent Literature 1 reports that controlling the gel fraction and heat of fusion of the poly(3-hydroxyalkanoate) foam particles within the given ranges results in a poly(3-hydroxyalkanoate) foam molded article having a good surface aspect and a low mold shrinkage ratio. However, the present inventors have confirmed that the foam particles of Patent Literature 1 can have odor derived from an aromatic compound such as benzene because the particles are produced using benzoyl peroxide as a crosslinking agent.

Patent Literature 2 reports that poly(3-hydroxyalkanoate) resin foam particles which are moldable into a molded article free from post-shrinkage under a wide range of molding conditions can be obtained by melting and kneading a poly(3-hydroxyalkanoate) and an isocyanate compound using a device such as an extruder to give a resin composition having a melt viscosity equal to or higher than a given value and then by foaming the resin composition with the aid of a blowing agent. However, some isocyanate compounds are toxic, and the use of an isocyanate compound could cause yellowing of the resulting foam particles. Additionally, in examples of Patent Literature 2, the resin composition is held under high-temperature and high-pressure conditions for as long as 1 hour after introduction of the blowing agent. This reduces the foam particle productivity.

In view of the above circumstances, the present invention aims to provide a method by which poly(3-hydroxyalkanoate) foam particles having little or no odor can be obtained with high productivity and a method for producing a poly (3-hydroxyalkanoate) foam molded article using the foam particles.

Solution to Problem

As a result of intensive researches with the goal of solving the above problems, the present inventors have found that poly(3-hydroxyalkanoate) foam particles having little or no odor can be obtained with high productivity when a given mixture is used as a poly(3-hydroxyalkanoate), a given compound is used as a crosslinking agent, and a given temperature is maintained for a given period of time after introduction of a blowing agent. Based on this finding, the inventors have completed the present invention.

A first aspect of the present invention relates to a method for producing poly(3-hydroxyalkanoate) foam particles, the method comprising: introducing a blowing agent into an aqueous dispersion in a pressure-resistant vessel, the aqueous dispersion containing a crosslinking agent and resin particles containing a poly(3-hydroxyalkanoate); heating the contents of the pressure-resistant vessel to a given temperature in a range of 130 to 150° C. and holding the contents of the pressure-resistant vessel at the given temperature for 5 to 55 minutes; and opening one end of the pressure-resistant vessel to discharge the contents of the pressure-resistant vessel into a low-pressure atmosphere and foam the resin particles, wherein the poly(3-hydroxyalkanoate) is a mixture containing a poly(3-hydroxyalkanoate) copolymer and a poly(3-hydroxybutyrate) homopolymer at a weight ratio of 99:1 to 80:20, and the crosslinking agent is an organic peroxide which is a percarbonate.

Preferably, the blowing agent is carbon dioxide.

Preferably, the poly(3-hydroxyalkanoate) copolymer is a copolymer of 3-hydroxybutyrate and a comonomer, and a 3-hydroxybutyrate/comonomer ratio in the copolymer is from 99/1 to 89/11 (mol %/mol %).

Preferably, the organic peroxide which is a percarbonate has a 1 minute half-life temperature of 150 to 170° C. and is liquid at room temperature.

Preferably, the organic peroxide which is a percarbonate is a compound having one carbonate group.

Preferably, the method further comprises, after the foaming of the resin particles, impregnating the resulting foam particles with an inorganic gas to increase a pressure inside the foam particles and subsequently heating the foam particles to expand the foam particles.

The present invention further relates to a method for producing a poly(3-hydroxyalkanoate) foam molded article, the method comprising: producing poly(3-hydroxyalkanoate) foam particles by the method as defined above; and heating and molding the foam particles in a mold.

Advantageous Effects of Invention

The present invention can provide a method by which poly(3-hydroxyalkanoate) foam particles having little or no odor can be obtained with high productivity and a method for producing a poly(3-hydroxyalkanoate) foam molded article using the foam particles.

DESCRIPTION OF EMBODIMENTS

Figure 1:
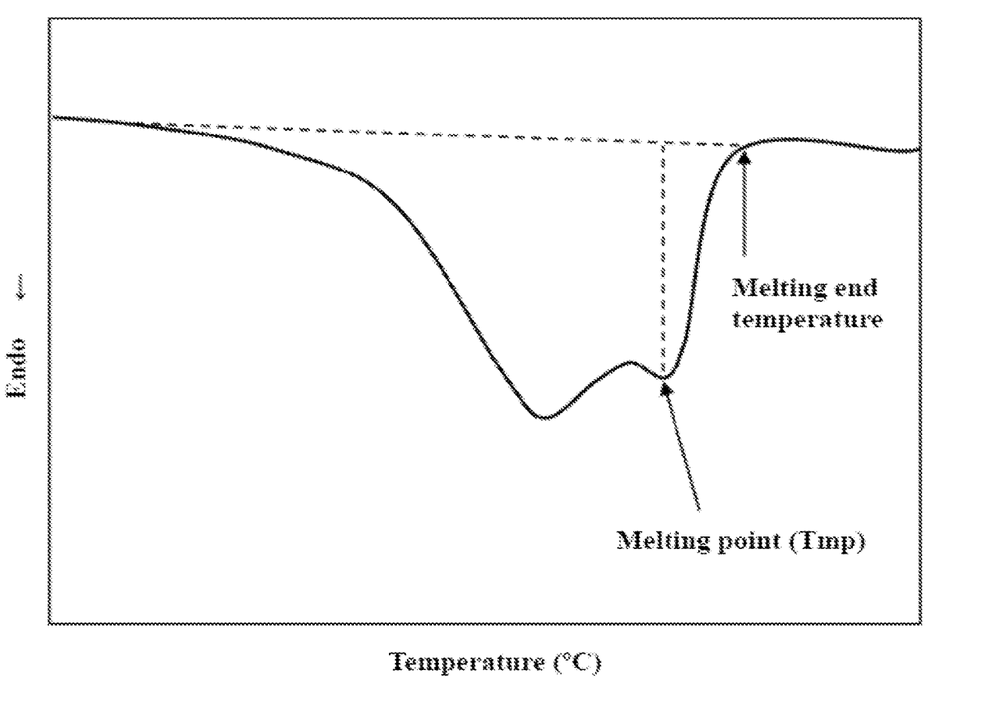
FIGURE shows a DSC curve of resin particles made of a P3HA composition and parameters such as melting point which are determined based on the DSC curve.

Hereinafter, embodiments of the present invention will be described. The present invention is not limited to the embodiments described below.

P3HA foam particles according to an embodiment can be obtained by foaming resin particles made of a P3HA composition with the aid of a blowing agent. A P3HA foam molded article can be obtained by heating and molding the P3HA foam particles in a mold, namely, by in-mold foam molding of the P3HA foam particles.

[P3HA]

The P3HA is a polymer containing 3-hydroxyalkanoate repeating units as essential structural units (monomer units). In particular, the P3HA is preferably a polymer containing repeating units represented by the following formula (1).

$$[—CHR—CH_2—CO—O—] \quad (1)$$

In the formula (1), R is an alkyl group represented by $C_pH_{2p+1}$ and p is an integer from 1 to 15. Examples of the R group include linear or branched alkyl groups such as methyl, ethyl, propyl, methylpropyl, butyl, isobutyl, t-butyl, pentyl, and hexyl groups. The integer p is preferably from 1 to 10 and more preferably from 1 to 8.

The P3HA is particularly preferably a microbially produced P3HA. The microbially produced P3HA is a poly [(R)-3-hydroxyalkanoate] in which all of the 3-hydroxyalkanoate repeating units are (R)-3-hydroxyalkanoate repeating units.

In the present embodiment, a mixture containing a poly (3-hydroxyalkanoate) copolymer and a poly(3-hydroxybutyrate) homopolymer is used as the P3HA. The term "P3HA" as used hereinafter refers to this mixture.

The poly(3-hydroxyalkanoate) copolymer is a copolymer containing at least two types of 3-hydroxyalkanoate units or a copolymer containing at least one type of 3-hydroxyalkanoate units and comonomer units other than 3-hydroxyalkanoate units. The poly(3-hydroxyalkanoate) copolymer is preferably a copolymer containing at least 3-hydroxybutyrate units.

Specific examples of the poly(3-hydroxyalkanoate) copolymer include poly(3-hydroxybutyrate-co-3-hydroxypropionate), poly(3-hydroxybutyrate-co-3-hydroxyvalerate) abbreviated as "P3HB3HV", poly(3-hydroxybutyrate-co-3-hydroxyvalerate-3-hydroxyhexanoate), poly(3-hydroxybutyrate-co-3-hydroxyhexanoate) abbreviated as "3HB3HH", poly(3-hydroxybutyrate-co-3-hydroxyheptanoate), poly(3-hydroxybutyrate-co-3-hydroxyoctanoate), poly(3-hydroxybutyrate-co-3-hydroxynonanoate), poly(3-hydroxybutyrate-co-3-hydroxydecanoate), poly(3-hydroxybutyrate-co-3-hydroxyundecanoate), and poly(3-hydroxybutyrate-co-4-hydroxybutyrate) abbreviated as "P3HB4HB". One poly(3-hydroxyalkanoate) copolymer may be used alone or two or more poly(3-hydroxyalkanoate) copolymers may be used in combination. In terms of the processability of the P3HA and the physical properties of the foam molded article, poly(3-hydroxybutyrate-co-3-hydroxyhexanoate) and/or poly(3-hydroxybutyrate-co-4-hydroxybutyrate) is preferred, and poly (3-hydroxybutyrate-co-3-hydroxyhexanoate) is particularly preferred.

When the poly(3-hydroxyalkanoate) copolymer is a copolymer of 3-hydroxybutyrate and a comonomer, the composition ratio between 3-hydroxybutyrate and the comonomer such as 3-hydroxyhexanoate (hereinafter also referred to as "3HH") or 4-hydroxybutyrate (hereinafter also referred to as "4HB"), i.e., the 3-hydroxybutyrate/comonomer ratio in the copolymer is preferably from 99/1 to 89/11 (mol %/mol %), more preferably from 97/3 to 91/9 (mol %/mol %), and even more preferably from 95/5 to 93/7 (mol %/mol %). When the proportion of the comonomer in the copolymer is 1 mol % or more, the melt processing temperature range and thermal decomposition temperature range of the P3HA are away from each other, and this is likely to lead to high processability. When the proportion of the comonomer in the copolymer is 11 mol % or less, crystallization proceeds quickly during melt processing, and this is likely to lead to high productivity.

The proportions of the monomers can be determined by a method known to those skilled in the art, such as by a method described in WO 2013/147139.

The poly(3-hydroxybutyrate) homopolymer mentioned above is a homopolymer consisting essentially of 3-hydroxybutyrate units (this homopolymer is abbreviated as "P3HB"). It should be noted that a copolymer containing 3-hydroxybutyrate and a small amount of comonomer (specifically, the proportion of the comonomer is less than 1 mol %) may be classified as the homopolymer. With the use of the mixture containing the poly(3-hydroxyalkanoate) copolymer and the poly(3-hydroxybutyrate) homopolymer, even if the foaming temperature is high, the component derived from the poly(3-hydroxybutyrate) homopolymer resists being melted completely, and crystal growth proceeds readily. This can increase the foam particle productivity.

In the mixture containing the poly(3-hydroxyalkanoate) copolymer and the poly(3-hydroxybutyrate) homopolymer, the weight ratio between the two polymers (copolymer: homopolymer) is preferably from 99:1 to 80:20, more preferably from 98:2 to 84:16, even more preferably from 97:3 to 88:12, and particularly preferably from 96:4 to 90:10 in order to reliably obtain the foam particles at a high foaming temperature and increase the foam particle productivity.

The melting point of the P3HA is not particularly limited but is preferably from 110 to 170° C. and more preferably from 120 to 165° C. If the melting point is lower than 110° C., the resulting P3HA foam molded article is likely to undergo a large dimensional change upon heating. If the melting point is higher than 170° C., hydrolysis is likely to occur during the foaming step. The melting point of the P3HA is measured as the highest melting peak temperature in a DSC curve obtained by differential scanning calorimetry which uses a differential scanning calorimeter (DSC 7020 manufactured by Hitachi High-Tech Science Corporation) and in which about 5 mg of the P3HA is heated from 10° C. to 190° C. at a rate of 10° C./min.

The weight-average molecular weight of the P3HA is not particularly limited but is preferably from $20 \times 10^4$ to $200 \times 10^4$, more preferably from $25 \times 10^4$ to $150 \times 10^4$, and even more preferably from $30 \times 10^4$ to $100 \times 10^4$. When the weight-average molecular weight is $20 \times 10^4$ or more, the resulting P3HA foam particles are likely to have a high closed-cell ratio. When the weight-average molecular weight is $200 \times 10^4$ or less, the load imposed on the machinery used in melt processing such as production of the resin particles is reduced, and this is likely to lead to high productivity. The weight-average molecular weight of the P3HA can be determined based on a polystyrene-equivalent molecular weight distribution obtained by gel permeation chromatography (HPLC GPC system manufactured by Shimadzu Corporation) using a chloroform solution of the P3HA. The column used in the gel permeation chromatography may be any column suitable for weight-average molecular weight measurement.

The method for producing the P3HA is not limited to a particular technique, and may be a chemical synthesis production method or a microbial production method. As previously stated, a microbial production method is preferred. The microbial production method used can be a known or common method.

Known examples of bacteria that produce copolymers of 3-hydroxybutyrate and other hydroxyalkanoates include *Aeromonas caviae* which is a P3HB3HV- and P3HB3HH-producing bacterium and *Alcaligenes eutrophus* which is a P3HB4HB-producing bacterium. In particular, in order to increase the P3HB3HH productivity, *Alcaligenes eutrophus* AC32 (FERM BP-6038) having a P3HA synthase gene introduced is more preferred (see T. Fukui, Y Doi, *J. Bateriol.*, 179, pp. 4821-4830 (1997)). Such a microorganism is cultured under suitable conditions to allow the microorganism to accumulate P3HB3HH in its cells, and the microbial cells accumulating P3HB3HH are used. Instead of the above microorganism, a genetically modified microorganism having any suitable P3HA synthesis-related gene introduced may be used depending on the P3HA to be produced. The culture conditions including the type of the substrate may be optimized depending on the P3HA to be produced.

The method for obtaining the mixture of the poly(3-hydroxyalkanoate) copolymer and the poly(3-hydroxybutyrate) homopolymer is not limited to a particular technique. The mixture may be obtained directly by microbial production or chemical synthesis. The mixture may be obtained by melting and kneading two or more resins using a device such as an extruder, a kneader, a Banbury mixer, or a roll mill or by solving and mixing two or more resins in a solvent and then drying the resulting mixture. As previously stated, it is preferable to directly obtain the mixture using a microorganism. The microbial production method used can be, for example, a method described in WO 2015/146195.

[Resin Particles Made of P3HA Composition]

The resin particles made of the P3HA composition are particles made of a composition (P3HA composition) containing the P3HA as an essential component. Typically, the composition contains the P3HA and additives added as necessary. In the present disclosure, the term "resin particles" refer to unfoamed particles that have yet to be subjected to any foaming step.

The content of the P3HA in the resin particles made of the P3HA composition is not particularly limited. In terms of the biodegradability of the resulting foam particles or foam molded article, the content of the P3HA is preferably 70 wt % or more and more preferably 80 wt % or more.

The melting point (hereinafter also referred to as "Tmp") of the resin particles made of the P3HA composition is not particularly limited but is preferably from 110 to 170° C. and more preferably from 120 to 165° C. If the melting point is lower than 110° C., the resulting P3HA foam molded article is likely to undergo a large dimensional change upon heating. If the melting point is higher than 170° C., hydrolysis of the P3HA is likely to occur during the foaming step. The melting point of the resin particles made of the P3HA composition is measured as the highest melting peak temperature in a DSC curve obtained by differential scanning calorimetry which uses a differential scanning calorimeter (DSC 7020 manufactured by Hitachi High-Tech Science Corporation) and in which about 5 mg of the resin particles made of the P3HA composition are heated from 10° C. to 190° C. at a rate of 10° C./min.

The melt flow rate (hereinafter also referred to as "MFR") of the resin particles made of the P3HA composition is not particularly limited but is preferably from 1 to 30 g/10 min, more preferably from 1 to 25 g/10 min, and even more preferably from 1 to 20 g/10 min. If the MFR is less than 1 g/10 min, foam particles having a low apparent density are likely to be difficult to obtain by a single foaming step. If the MFR is more than 30 g/10 min, the resulting foam particles are likely to have a low closed-cell ratio. The MFR of the resin particles made of the P3HA composition can be measured using a melt flow index tester (manufactured by Yasuda Seiki Seisakusho, Ltd.) according to JIS K 7210 under a load of 5 kg at a measurement temperature which is 1 to 10° C. above the melting end temperature observed in the DSC curve obtained in the above-described measurement of the melting point of the resin particles made of the P3HA composition.

The weight per piece of the resin particles made of the P3HA composition is preferably from 0.3 to 10 mg, more preferably from 0.4 to 7.5 mg, and even more preferably from 0.5 to 5 mg. When the weight per piece is 0.3 mg or more, the resin particles made of the P3HA composition can be stably produced with high productivity. When the weight per piece is 10 mg or less, thinning of the P3HA foam molded article can easily be achieved.

When the resin particles made of the P3HA composition are cylindrical in shape, the length/diameter ratio of the resin particles is preferably from 0.5 to 3, more preferably from 0.7 to 2.7, and even more preferably from 1 to 2.5. If the length/diameter ratio is less than 0.5, the resulting foam particles are likely to be flattened in shape. If the length/diameter ratio is more than 3, the foam particles are likely to be elongated in shape.

The resin particles made of the P3HA composition may contain additives to the extent that the additives do not impair the effect of the invention. Examples of the additives include a cell controlling agent, a nucleating agent, a lubricant, a plasticizer, an antistatic, a flame retardant, a conductive additive, a heat insulator, a crosslinking agent, an antioxidant, an ultraviolet absorber, a coloring agent, an inorganic filler, an organic filler, and a hydrolysis inhibitor, and these additives can be used according to the purpose. In particular, biodegradable additives are preferred.

Examples of the cell controlling agent include talc, silica, calcium silicate, calcium carbonate, aluminum oxide, titanium oxide, diatomite, clay, sodium bicarbonate, alumina, barium sulfate, aluminum oxide, and bentonite. Among these, talc is preferred due to its superiority in the dispersibility in the P3HA. The amount of the cell controlling agent used is not particularly limited but is preferably from 0.01 to 1 parts by weight, more preferably from 0.03 to 0.5 parts by weight, and even more preferably from 0.05 to 0.3 parts by weight per 100 parts by weight of the P3HA. One cell controlling agent may be used alone, or two or more cell controlling agents may be mixed. The mixing ratio between the two or more cell controlling agents can be adjusted as appropriate according to the purpose.

Examples of the nucleating agent include pentaerythritol, orotic acid, aspartame, cyanuric acid, glycine, zinc phenylphosphonate, and boron nitride. Among these, pentaerythritol is preferred due to its superiority in the accelerating effect on crystallization of the P3HA. The amount of the nucleating agent used is not particularly limited but is preferably from 0.1 to 5 parts by weight, more preferably from 0.5 to 3 parts by weight, and even more preferably from 0.7 to 1.5 parts by weight per 100 parts by weight of the P3HA. One nucleating agent may be used alone, or two or more nucleating agents may be mixed. The mixing ratio between the two or more nucleating agents can be adjusted as appropriate according to the purpose.

Examples of the lubricant include behenamide, oleamide, erucamide, stearamide, palmitamide, N-stearyl behenamide, N-stearyl erucamide, ethylenebis(stearamide), ethylenebis(oleamide), ethylenebis(erucamide), ethylenebis(lauramide), ethylenebis(capramide), p-phenylenebis(stearamide), and a product of polycondensation of ethylenediamine, stearic acid, and sebacic acid. Among these, behenamide and erucamide are preferred due to their superiority in the lubricating effect on the P3HA. The amount of the lubricant used is not particularly limited but is preferably from 0.01 to 5 parts by weight, more preferably from 0.05 to 3 parts by weight, and even more preferably from 0.1 to 1.5 parts by weight per 100 parts by weight of the P3HA. One lubricant may be used alone, or two or more lubricants may be mixed. The mixing ratio between the two or more lubricants can be adjusted as appropriate according to the purpose.

Examples of the plasticizer include glycerin ester compounds, citric ester compounds, sebacic ester compounds, adipic ester compounds, polyether ester compounds, benzoic ester compounds, phthalic ester compounds, isosorbide ester compounds, polycaprolactone compounds, and dibasic ester compounds. Among these, glycerin ester compounds, citric ester compounds, sebacic ester compounds, and dibasic ester compounds are preferred due to their superiority in the plasticizing effect on the P3HA. Examples of the glycerin ester compounds include glycerin diacetomonolaurate. Examples of the citric ester compounds include tributyl acetylcitrate. Examples of the sebacic ester compounds include dibutyl sebacate. Examples of the dibasic ester compounds include benzyl methyl diethylene glycol adipate. The amount of the plasticizer used is not particularly limited but is preferably from 1 to 20 parts by weight, more preferably from 2 to 15 parts by weight, and even more preferably from 3 to 10 parts by weight per 100 parts by weight of the P3HA. One plasticizer may be used alone, or two or more plasticizers may be mixed. The mixing ratio between the two or more plasticizers can be adjusted as appropriate according to the purpose.

Examples of the coloring agent include: organic pigments such as azo pigments, polycondensed azo pigments, azomethine group-containing azo pigments, azomethine pigments, anthraquinone pigments, phthalocyanine pigments, perinone/perylene pigments, indigo/thioindigo pigments, dioxazine pigments, quinacridone pigments, isoindolinone pigments, diketopyrrolopyrrole pigments, and quinophthalone pigments; and inorganic pigments such as iron oxide pigments, iron hydroxide pigments, iron hexacyanoferrate pigments, carbon black pigments, titanium oxide pigments, and composite oxide pigments. The amount of the coloring agent used is not particularly limited but is preferably from 0.001 to 5 parts by weight, more preferably from 0.05 to 5 parts by weight, and even more preferably from 0.1 to 2 parts by weight per 100 parts by weight of the P3HA. One coloring agent may be used alone, or two or more coloring agents may be mixed. The mixing ratio between the two or more coloring agents can be adjusted as appropriate according to the purpose.

In production of the resin particles made of the P3HA composition, a compound containing an isocyanate group can be used (this compound will be referred to as "isocyanate compound" hereinafter). However, some isocyanate compounds are toxic. Additionally, the use of an isocyanate compound could cause yellowing of the resulting P3HA foam particles or foam molded article. Thus, the amount of the isocyanate compound used is preferably less than 3 parts by weight, more preferably less than 1 part by weight, and even more preferably less than 0.1 parts by weight per 100 parts by weight of the P3HA. Most preferably, the resin particles are free of any isocyanate compound.

For example, a polyisocyanate compound having two or more isocyanate groups per molecule can be used as the isocyanate compound. Specific examples of the isocyanate compound include aromatic, alicyclic, and aliphatic isocyanates. Examples of the aromatic isocyanates include isocyanate compounds having a tolylene, diphenylmethane, naphthylene, tolidine, xylene, or triphenylmethane skeleton. Examples of the alicyclic isocyanates include isocyanate compounds having an isophorone skeleton or a hydrogenated diphenylmethane skeleton. Examples of the aliphatic isocyanates include isocyanate compounds having a hexamethylene or lysine skeleton. A combination of two or more of the above isocyanate compounds can be used. In terms of utility, ease of handling, and weathering resistance, the use of a polyisocyanate having a tolylene or diphenylmethane skeleton is preferred, and the use of a polyisocyanate having a diphenylmethane skeleton is particularly preferred.

The resin particles made of the P3HA composition (and also the P3HA foam particles) may be substantially free of a resin component other than the P3HA (this resin component is also referred to as "additional resin component" hereinafter) or may further contain the additional resin component. Examples of the additional resin component include aliphatic or aliphatic-aromatic polyesters such as polylactic acid, polybutylene succinate, polybutylene succinate adipate, polybutylene adipate terephthalate, polybutylene succinate terephthalate, and polycaprolactone. One additional resin component may be used alone, or two or more additional resin components may be used in combination. The content of the additional resin component in the resin particles made of the P3HA composition (and also in the P3HA foam particles) is not particularly limited. For example, the content of the additional resin component is preferably from 10 to 400 parts by weight and more preferably from 50 to 150 parts by weight per 100 parts by weight of the P3HA.

The method for producing the resin particles made of the P3HA composition is not limited to a particular technique, and the resin particles made of the P3HA composition can be produced using a known or common method. For example, the P3HA and optionally the additives are first melted and kneaded using a device such as an extruder, a kneader, a Banbury mixer, or a roll mill, then the molten P3HA composition is discharged from a die nozzle and cooled, and the cooled composition is cut. With this method, resin particles shaped to be easily usable in foaming can be obtained, such as cylindrical, elliptic cylindrical, spherical, cubic, or rectangular parallelepiped-shaped resin particles. A twin-screw extruder is preferred as the production device in terms of productivity and convenience.

In the production method of the resin particles made of the P3HA composition, the temperature at which the P3HA and optionally the additives are melted and kneaded depends on the properties such as the melting point and weight-average molecular weight of the P3HA and on the additives used and cannot be definitely specified. For example, the temperature of the molten P3HA composition discharged from the die nozzle is preferably from 150 to 200° C., more preferably from 160 to 195° C., and even more preferably from 170 to 190° C. If the temperature of the molten P3HA composition is lower than 150° C., melting and kneading of the P3HA composition are likely to be insufficient. If the temperature of the molten P3HA composition is higher than 200° C., the P3HA is likely to be thermally decomposed.

In the production method of the resin particles made of the P3HA composition, the temperature at which the molten P3HA composition discharged from the die nozzle is cooled is not particularly limited but is preferably from 20 to 80° C., more preferably from 30 to 70° C., and even more preferably from 40 to 60° C. When the cooling temperature is 20° C. or higher, the crystallization of the molten P3HA composition proceeds quickly, and this is likely to lead to high productivity in the production of the resin particles made of the P3HA composition. When the cooling temperature is 80° C. or lower, the crystallization of the molten P3HA composition proceeds quickly, and this is likely to lead to high productivity in the production of the resin particles made of the P3HA composition.

[P3HA Foam Particles]

The P3HA foam particles according to the present embodiment can be obtained by foaming the above resin particles made of the P3HA composition with the aid of a blowing agent.

The gel fraction of the P3HA foam particles is an indicator of the degree of crosslinking of the P3HA in the foam particles. The gel fraction is not particularly limited but is preferably in the range of 20 to 90 wt %. The gel fraction may be more than 75 wt % and may be, for example, 76 wt % or more. The gel fraction may be more than 80 wt % and may be, for example, 81 wt % or more. The gel fraction of the P3HA foam particles can be controlled depending on the type or amount of the crosslinking agent described later.

The method for measuring the gel fraction of the P3HA foam particles is as follows. A 100-ml flask is charged with 0.5 g of the foam particles and 50 ml of chloroform, which are heated under reflux at atmospheric pressure and 62° C. for 8 hours. The resulting heat-treated product is subjected to filtration using a suction filtration device equipped with a 100-mesh metal screen. The resulting filtered product on the mesh screen is dried in an oven at 80° C. under vacuum for 8 hours. The weight Wgw (g) of the resulting dried product is measured. The gel fraction is calculated as Wgw/0.5×100 (wt %).

The weight per piece of the P3HA foam particles is preferably from 0.3 to 10 mg, more preferably from 0.4 to 7.5 mg, and even more preferably from 0.5 to 5 mg. When the weight per piece is 0.3 mg or more, the resin particles made of the P3HA composition can be stably produced with high productivity, and thus the resulting P3HA foam particles are likely to be uniform. When the weight per piece is 10 mg or less, thinning of the P3HA foam molded article can easily be achieved.

When the P3HA foam particles are cylindrical in shape, the length/diameter ratio of the foam particles is preferably from 0.5 to 2.5, more preferably from 0.7 to 1.5, and even more preferably from 0.8 to 1.2. If the length/diameter ratio is less than 0.5, the surface aspect of the foam molded article is likely to be poor. If the length/diameter ratio is more than 2.5, the filling performance in in-mold foam molding is likely to be low.

The apparent density of the P3HA foam particles is not particularly limited but is preferably from 20 to 150 g/L, more preferably from 23 to 140 g/L, and even more preferably from 25 to 130 g/L. In the case where P3HA foam particles having a desired apparent density cannot be obtained by a single foaming step, the foam particles resulting from the first foaming step may be subjected to the second and subsequent foaming steps. The apparent density of the P3HA foam particles is measured as follows. A graduated cylinder containing ethanol is prepared, and the foam particles weighing Wd (g) are submerged into the ethanol in the graduated cylinder using a tool such as a metal screen. The volume Vd (L) of the foam particles is determined from the increase in the ethanol level. The apparent density of the foam particles is calculated as Wd/Vd (g/L).

The closed-cell ratio of the P3HA foam particles is not particularly limited but is preferably 88% or more, more preferably 90% or more, and even more preferably 93% or more. If the closed-cell ratio is less than 88%, the mold shrinkage ratio of the resulting foam molded article is likely to be high. The method for measuring the closed-cell ratio of the P3HA foam particles is as follows. The volume Vc (cm$^3$) of the P3HA foam particles is measured using an air comparison pycnometer (Model 1000, manufactured by Tokyo-Science, Co., Ltd.) according to the method specified in PROCEDURE C of ASTM D2856-87. Next, all of the foam particles subjected to the measurement of the volume Vc are submerged into ethanol in a graduated cylinder, and the apparent volume Va (cm$^3$) of the foam particles is determined from the increase in the liquid level of the graduated cylinder (submersion method). The closed-cell ratio of the foam particles is calculated as 100−(Va−Vc)×100/Va (%).

The average cell size of the P3HA foam particles is not particularly limited but is preferably from 50 to 500 μm and more preferably from 100 to 400 μm. The method for measuring the average cell size of the P3HA foam particles is as follows. The foam particles are cut into halves with a razor blade (Hi-stainless Double Edge Blade, manufactured by FEATHER Safety Razor Co., Ltd.). The cut surface of each foam particle is observed with an optical microscope (VHX-100, manufactured by Keyence Corporation) at 50-fold magnification, and a straight line passing substantially through the center of the foam particle is drawn in the observed image. The number n of the cells through which the straight line passes is counted, and the foam particle size L (μm) defined by the intersections of the straight line with the outer surface of the foam particle is determined. The average cell size of the foam particles is calculated as L/n (μm).

The P3HA foam particles can be produced by the method descried hereinafter.

First, a blowing agent is introduced into a pressure-resistant vessel holding an aqueous dispersion containing the resin particles made of the P3HA composition, water, a crosslinking agent, and optionally a dispersant, a dispersion aid, a crosslinking aid, and/or a plasticizer. Specifically, the resin particles made of the P3HA composition, water, a crosslinking agent, and optionally a dispersant, a dispersion aid, a crosslinking aid, and/or a plasticizer are placed into a pressure-resistant vessel under stirring and thoroughly dispersed to prepare an aqueous dispersion, and then a blowing agent is introduced into the pressure-resistant vessel. Alternatively, the resin particles made of the P3HA composition, water, a crosslinking agent, and optionally a dispersant, a dispersion aid, a crosslinking aid, and/or a plasticizer may be thoroughly dispersed in a vessel other than a pressure-resistant vessel, and then the resulting dispersion and a blowing agent may be sequentially introduced into the pressure-resistant vessel.

Next, the contents of the pressure-resistant vessel are heated to a given temperature (foaming temperature) in the range of 130 to 150° C. and held at the given temperature for 5 to 55 minutes. Thus, the resin particles are softened, and at the same time the resin particles are impregnated with the blowing agent and impregnated and reacted with the crosslinking agent. In the present embodiment, since the mixture of the poly(3-hydroxyalkanoate) copolymer and the poly(3-hydroxybutyrate) homopolymer is used as the P3HA, a high foaming temperature can be used, and accordingly the holding time can be reduced to increase the foam particle productivity. Additionally, the use of an organic peroxide which is a percarbonate as the crosslinking agent can reduce the odor of the foam particles despite the short holding time.

After holding at the given temperature, one end of the pressure-resistant vessel is opened to discharge the contents of the pressure-resistant vessel such as the resin particles and water into an atmosphere having a pressure lower than the pressure inside the pressure-resistant vessel, thereby foaming the resin particles and obtaining the P3HA foam particles (this series of procedures are also referred to as "depressurization foaming" hereinafter). The temperature inside the pressure-resistant vessel at the time of discharge into the low-pressure atmosphere is defined as the foaming temperature, and the pressure inside the pressure-resistant vessel at the time of discharge into the low-pressure atmosphere is defined as the foaming pressure.

The water is not limited to a particular type and may be any kind of water in which the resin particles made of the P3HA composition, the dispersant, the dispersion aid, the crosslinking agent, the blowing agent, and the other components can be uniformly dispersed. For example, the water used can be pure or ultrapure water such as RO water (water purified by reverse osmosis membrane filtration), distilled water, or deionized water (water purified using an ion-exchange resin). The amount of the water used is not particularly limited but is preferably from 100 to 1000 parts by weight per 100 parts by weight of the resin particles made of the P3HA resin composition.

Examples of the dispersant include inorganic substances such as tricalcium phosphate, trimagnesium phosphate, basic magnesium carbonate, calcium carbonate, barium sulfate, kaolin, talc, clay, aluminum oxide, titanium oxide, and aluminum hydroxide. The amount of the dispersant used is not particularly limited but is preferably from 0.1 to 3.0 parts by weight per 100 parts by weight of the resin particles made of the P3HA resin composition.

Examples of the dispersion aid include anionic surfactants such as sodium dodecylbenzenesulfonate, sodium α-olefin sulfonate, and sodium n-paraffin sulfonate. The amount of the dispersion aid used is not particularly limited but is preferably from 0.001 to 0.5 parts by weight and more preferably from 0.01 to 0.2 parts by weight per 100 parts by weight of the resin particles made of the P3HA resin composition.

An organic peroxide which is a percarbonate is used as the crosslinking agent. Organic peroxides need not be melted and kneaded together with the P3HA for mixing and reaction with the P3HA and, as previously stated, the resin particles can be impregnated and reacted with an organic peroxide after production of the resin particles. Thus, organic peroxides are crosslinking agents preferred in terms of the production process. With the use of an organic peroxide as the crosslinking agent, the molecular chains of the P3HA are bonded together directly to form a crosslinked structure without crosslinking agent-derived structures interposed between the molecular chains. With the use of an organic peroxide which is a percarbonate, the odor of the foam particles can be reduced.

The crosslinking agent desirably has the property of undergoing the crosslinking reaction at around the softening temperature of the resin particles, being well compatible with the P3HA, and easily penetrating into the resin particles. From this viewpoint, the organic peroxide which is a percarbonate is preferably an organic peroxide that has a 1 minute half-life temperature of 150 to 170° C. and that is liquid at room temperature. In particular, an organic peroxide having one carbonate group is preferred since such an organic peroxide can have the 1 minute half-life temperature as specified above. In order to avoid aromatic compound-derived odor, the organic peroxide which is a percarbonate is preferably a compound having no aromatic ring. Specific examples of the organic peroxide which is a percarbonate include t-butylperoxy-2-ethylhexyl monocarbonate (1 minute half-life temperature: 161° C.), t-butylperoxyisopropyl monocarbonate (1 minute half-life temperature: 159° C.), t-amylperoxy-2-ethylhexyl monocarbonate (1 minute half-life temperature: 155° C.), and t-amylperoxyisopropyl monocarbonate (1 minute half-life temperature: 153° C.). One of these crosslinking agents may be used alone, or two or more thereof may be used in combination.

The amount of the crosslinking agent used is not particularly limited but is preferably from 1.2 to 5 parts by weight, more preferably from 1.3 to 4 parts by weight, even more preferably from 1.4 to 3.5 parts by weight, and particularly preferably from 1.5 to 3 parts by weight per 100 parts by weight of the resin particles made of the P3HA resin composition. If the amount of the crosslinking agent used is less than 1.2 parts by weight, the gel fraction of the P3HA foam particles is not high enough, and the foam particles could not be molded into a foam molded article by in-mold foam molding or, even when the foam particles are moldable into a foam molded article by in-mold foam molding, the range of usable molding conditions is narrow. If the amount of the crosslinking agent used is more than 5 parts by weight, such use of the crosslinking agent is likely to be economically wasteful because the increase in the amount of the crosslinking agent does not necessarily provide an enhanced effect. The amount of the crosslinking agent used is correlated with the gel fraction of the P3HA foam particles and has an impact on the value of the gel fraction. Thus, it is desirable to choose the amount of the crosslinking agent taking into consideration the value of the gel fraction to be achieved.

Examples of the crosslinking aid include compounds having at least one unsaturated bond per molecule. Among such compounds, allyl esters, acrylic esters, methacrylic esters, and divinyl compounds are preferred. The amount of the crosslinking aid used is not particularly limited but is preferably from 0.01 to 3 parts by weight, more preferably from 0.03 to 1.5 parts by weight, and even more preferably from 0.05 to 1 parts by weight per 100 parts by weight of the resin particles made of the P3HA resin composition. The crosslinking aid need not be used.

Examples of the plasticizer include glycerin ester compounds, citric ester compounds, sebacic ester compounds, adipic ester compounds, polyether ester compounds, benzoic ester compounds, phthalic ester compounds, isosorbide ester compounds, polycaprolactone compounds, and dibasic ester compounds. Among these, glycerin ester compounds, citric ester compounds, sebacic ester compounds, and dibasic ester compounds are preferred due to their superiority in the plasticizing effect on the P3HA. Examples of the glycerin ester compounds include glycerin diacetomonolaurate. Examples of the citric ester compounds include tributyl acetylcitrate. Examples of the sebacic ester compounds include dibutyl sebacate. Examples of the dibasic ester compounds include benzyl methyl diethylene glycol adipate. The amount of the plasticizer used is not particularly limited but is preferably from 1 to 20 parts by weight, more preferably from 2 to 15 parts by weight, and even more preferably from 3 to 10 parts by weight per 100 parts by weight of the resin particles made of the P3HA composition. The plasticizer need not be used. One plasticizer may be used alone, or two or more plasticizers may be mixed. The mixing ratio between the two or more plasticizers can be adjusted as appropriate according to the purpose.

Examples of the blowing agent include: inorganic gases such as carbon dioxide, nitrogen, and air; saturated hydrocarbons having 3 to 5 carbon atoms such as propane, n-butane, isobutane, n-pentane, isopentane, and neopentane; ethers such as dimethyl ether, diethyl ether, and methyl ethyl ether; halogenated hydrocarbons such as monochloromethane, dichloromethane, and dichlorodifluoroethane; and water. At least one selected from the group comprising these blowing agents can be used. In particular, the use of carbon dioxide is preferred in terms of environmental load and foaming performance. The amount of the blowing agent added is not particularly limited but is preferably from 2 to 10000 parts by weight, more preferably from 5 to 5000 parts by weight, and even more preferably from 10 to 1000 parts by weight per 100 parts by weight of the resin particles made of the P3HA composition. If the amount of the blowing agent added is less than 2 parts by weight, foam particles having a low apparent density are likely to be difficult to obtain. If the amount of the blowing agent added is more than 10000 parts by weight, such use of the blowing agent is likely to be economically wasteful because the increase in the amount of the blowing agent does not necessarily provide an enhanced effect.

In the depressurization foaming, when the resin particles made of the P3HA composition are impregnated and reacted with the crosslinking agent and optionally the crosslinking aid, the oxygen concentration inside the pressure-resistant vessel and the content of dissolved oxygen in water are preferably reduced in order to increase the crosslinking efficiency. Examples of the method for this purpose include replacement of the oxygen with an inorganic gas such as carbon dioxide or nitrogen and removal of the oxygen by vacuuming.

In the depressurization foaming, the rate of temperature increase up to the desired foaming temperature (this rate is also referred to as "temperature increase rate" hereinafter) is preferably from 1 to 3° C./min and more preferably from 1.5 to 3° C./min. When the temperature increase rate is 1° C./min or higher, the productivity is likely to be high. When the temperature increase rate is 3° C./min or lower, the impregnation of the resin particles made of the P3HA composition with the blowing agent and the impregnation and reaction of the resin particles with the crosslinking agent can be sufficiently accomplished during the temperature increase.

In the depressurization foaming, as mentioned above, the given temperature (foaming temperature) is in the range of 130 to 150° C. If the given temperature is lower than 130° C., the resin particles made of the P3HA composition containing the poly(3-hydroxyalkanoate) copolymer and the poly(3-hydroxybutyrate) homopolymer are insufficiently impregnated with the blowing agent, and this could lead to a failure to foam the resin particles and thus a failure to obtain foam particles. If the given temperature is higher than 150° C., the P3HA could be hydrolyzed. The given temperature is preferably from 132 to 148° C., more preferably from 134 to 146° C., and even more preferably from 136 to 144° C. The given temperature may be higher than 140° C. and may be, for example, 141° C. or higher.

In the depressurization foaming, the foaming pressure (i.e., the pressure inside the pressure-resistant vessel) is preferably from 1 to 10 MPa (gauge pressure) and more preferably from 2 to 5 MPa (gauge pressure). If the foaming pressure is less than 1 MPa (gauge pressure), foam particles having a low apparent density are likely to be difficult to obtain.

In the depressurization foaming, as mentioned above, the time for which the contents of the pressure-resistant vessel are held at the given temperature is from 5 to 55 minutes. If the holding time is less than 5 minutes, the crosslinking agent could remain unreacted in the resin particles. If the holding time is more than 55 minutes, the foam particle productivity is insufficient. The holding time is preferably from 10 to 50 minutes, more preferably from 15 to 40 minutes, and even more preferably from 20 to 35 minutes.

In the depressurization foaming, when the contents of the pressure-resistant vessel are discharged into the low-pressure atmosphere, this discharge of the contents may be accomplished through an orifice with a diameter of 1 to 5 mm for purposes such as regulating the flow rate and reducing the variation of the expansion ratio. In the case where the resin particles made of the P3HA composition have a relatively high melting point, the low-pressure atmosphere may be filled with saturated water vapor for the purpose of improving the foaming performance.

In some cases, P3HA foam particles having a desired apparent density cannot be obtained only by the depressurization foaming. In such a case, the pressure inside the P3HA foam particles obtained by the depressurization foaming (this pressure is also referred to as "foam particle inner pressure" hereinafter) may be increased above ordinary pressure by a pressurization process in which the P3HA foam particles are placed into a pressure-resistant vessel and impregnated with an inorganic gas such as air or carbon dioxide and, after the pressurization process, the P3HA foam particles may be heated by means such as heated steam and thus further expanded into P3HA two-step-foam particles having the desired apparent density (this series of procedures is also referred to as "two-step foaming" hereinafter).

The foam particle inner pressure in the two-step foaming is preferably from 0.15 to 0.60 MPa (absolute pressure) and more preferably from 0.20 to 0.50 MPa (absolute pressure).

In the two-step foaming, the temperature inside the pressure-resistant vessel during impregnation of the P3HA foam particles with the inorganic gas is preferably from 10 to 90° C. and more preferably from 40 to 90° C.

In the two-step foaming, the pressure of the means such as heated steam for heating the P3HA foam particles (this pressure is also referred to as "two-step foaming pressure" hereinafter) varies depending on the properties of the foam particles used and the desired apparent density and cannot be definitely specified. The two-step foaming pressure is preferably from 0.01 to 0.17 MPa (gauge pressure) and more preferably from 0.01 to 0.10 MPa (gauge pressure).

The P3HA two-step-foam particles preferably have an apparent density, a closed-cell ratio, and an average cell size as described above for the P3HA foam particles.

[P3HA Foam Molded Article]

The method for producing the P3HA foam molded article is not limited to a particular technique, and the P3HA foam molded article can be produced by heating and molding the P3HA foam particles (including the P3HA two-step-foam particles; the same applies to the following description) in a mold. The heating and molding may be carried out using a known or common method. Examples of the method include, but are not limited to, the following in-mold foam molding methods (A) to (D).

(A) A method in which the P3HA foam particles are pressurized with an inorganic gas to impregnate the foam particles with the inorganic gas and allow the foam particles to have a given foam particle inner pressure, then a mold is filled with the foam particles, and the foam particles are heated by heated steam.

(B) A method in which a mold is filled with the P3HA foam particles, then the foam particles are compressed so that the volume of the foam particles in the mold is reduced by 10 to 75%, and the compressed foam particles are heated by heated steam.

(C) A method in which the P3HA foam particles are compressed by a gas pressure, a mold is filled with the compressed foam particles, and the foam particles are heated by heated steam while making use of the recovery capacity of the foam particles.

(D) A method in which a mold is filled with the P3HA foam particles without any particular pretreatment and then the foam particles are heated by heated steam.

In the production of the P3HA foam molded article, the pressure of the heated steam for heating the P3HA foam particles (this pressure is also referred to as "molding pressure" hereinafter) varies depending on various factors such as the properties of the foam particles used and cannot be definitely specified. The molding pressure is preferably from 0.05 to 0.30 MPa (gauge pressure) and more preferably from 0.08 to 0.25 MPa (gauge pressure).

In the method (A) of the above P3HA foam molded article production methods, the inorganic gas used can be, for example, air, nitrogen, oxygen, carbon dioxide, helium, neon, or argon, and at least one selected from the group comprising these gases can be used. Among these gases, air or carbon dioxide is preferred.

In the method (A) of the above P3HA foam molded article production methods, the foam particle inner pressure is preferably from 0.10 to 0.30 MPa (absolute pressure) and more preferably from 0.11 to 0.25 MPa (absolute pressure).

In the method (A) of the above P3HA foam molded article production methods, the temperature inside the pressure-resistant vessel during impregnation of the foam particles with the inorganic gas is preferably from 10 to 90° C. and more preferably from 40 to 90° C.

The P3HA foam molded article can be used in various products such as cushioning materials for packaging, boxes for agricultural products, boxes for fishes, automobile parts, materials for building construction, and materials for civil engineering.

EXAMPLES

Hereinafter, the present invention will be specifically described using examples. The technical scope of the present invention is not limited by the examples given below.

The materials used in Examples and Comparative Examples are listed below.

[Poly(3-hydroxyalkanoate)]

P3HA-1: A mixture of P3HB3HH and P3HB (weight ratio=92:8, monomer ratio 3HB/3HH in P3HB3HH=95/5 (mol %/mol %))

P3HA-2: A mixture of P3HB3HH and P3HB (weight ratio=96:4, monomer ratio 3HB/3HH in P3HB3HH=95/5 (mol %/mol %))

P3HA-3: P3HB3HH, 100 wt % (monomer ratio 3HB/3HH in P3HB3HH=95/5 (mol %/mol %))

[Cell Controlling Agent]

Cell controlling agent: Talc (Talcan Powder PK-S manufactured by Hayashi Kasei Co., Ltd)

[Dispersant]

Dispersant: Tricalcium phosphate (manufactured by Taihei Chemical Industrial Co., Ltd.)

[Dispersion Aid]

Dispersion aid: Sodium alkylsulfonate (LATEMUL PS manufactured by Kao Corporation)

[Crosslinking Agent]

Crosslinking agent-1: t-Butylperoxy-2-ethylhexyl carbonate (content: 97%) (PERBUTYL E manufactured by NOF Corporation)

Crosslinking agent-2: Benzoyl peroxide (content: 75%) (NYPER BW manufactured by NOF Corporation)

The following describes the methods for evaluations carried out in Examples and Comparative Examples.

[Measurement of Melting Point of Resin Particles Made of P3HA Composition]

About 5 mg of the resin particles made of the P3HA composition were weighed out and subjected to differential scanning calorimetry which used a differential scanning calorimeter (DSC 7020 manufactured by Hitachi High-Tech Science Corporation) and in which the resin particles were heated from 10° C. to 190° C. at a rate of 10° C./min. The highest melting peak temperature in the DSC curve obtained by the calorimetry was determined as the melting point of the resin particles (see FIGURE).

[Measurement of MFR of Resin Particles Made of P3HA Composition]

The MFR of the resin particles made of the P3HA composition was measured using a melt flow index tester (manufactured by Yasuda Seiki Seisakusho, Ltd.) according to HS K 7210 under a load of 5 kg at a measurement temperature which was 1 to 10° C. above the melting end temperature observed in the DSC curve obtained in "Measurement of melting point of resin particles made of P3HA composition".

[Evaluation of P3HA Foam Particle Productivity]

The P3HA foam particle productivity was rated according to the following criteria.
  Excellent: In the P3HA foam particle production, the time from the start of heating to the start of foaming was 55 minutes or less and the productivity was very high.
  Good: In the P3HA foam particle production, the time from the start of heating to the start of foaming was between 56 and 70 minutes and the productivity was high.
  Poor: In the P3HA foam particle production, the time from the start of heating to the start of foaming was between 71 and 100 minutes and the productivity was low.
  Very poor: In the P3HA foam particle production, the time from the start of heating to the start of foaming was more than 100 minutes and the productivity was very low, or foam particles were not obtained.

[Evaluation of Odor of P3HA Foam Particles]

Sensory testing was conducted by 10 panelists engaged in handling crosslinking agents. Ratings on whether the P3HA foam particles emitted odor derived from the crosslinking agent or a decomposition product of the crosslinking agent were made according to the following criteria.
  Good: All of the 10 panelists determined that the P3HA foam particles were free of odor.
  Average: One to nine of the panelists determined that the P3HA foam particles had odor.
  Poor: All of the 10 panelists determined that the P3HA foam particles had odor.
  Very poor: All of the 10 panelists determined that the P3HA foam particles had aromatic compound-derived odor.

[Measurement of Gel Fraction of P3HA Foam Particles]

A 100-ml flask was charged with 0.5 g of the P3HA foam particles and 50 ml of chloroform, which were heated under reflux at atmospheric pressure and 62° C. for 8 hours. The resulting heat-treated product was subjected to filtration using a suction filtration device equipped with a 100-mesh metal screen. The resulting filtered product on the mesh screen was dried in an oven at 80° C. under vacuum for 8 hours. The weight Wgw (g) of the resulting dried product was measured. The gel fraction was determined as Wgw/0.5×100 (wt %).

[Measurement of Apparent Density of P3HA Foam Particles or P3HA Two-Step-Foam Particles]

A graduated cylinder containing ethanol was prepared, and the P3HA foam particles or P3HA two-step-foam particles (the weight of the foam particles was Wd (g)) were submerged into the ethanol in the graduated cylinder using a tool such as a metal screen. The volume Vd (L) of the foam particles was determined from the increase in the ethanol level. The apparent density of the foam particles was determined as Wd/Vd (g/L).

[Measurement of Density of P3HA Foam Molded Article]

The length, width, and thickness of the P3HA foam molded article were measured with a digital caliper, and the volume of the foam molded article was determined from the measured values. The weight of the foam molded article was divided by the volume of the foam molded article, and the resulting value was adopted as the density of the foam molded article.

Example 1

[Production of Resin Particles Made of P3HA Composition]

P3HA-1 was used as the P3HA, and 100 parts by weight of P3HA-1 and 0.1 parts by weight of the cell controlling agent were weighed out and dry-blended. The mixture resulting from the dry blending was melted and kneaded using a twin-screw extruder (TEM-26SX manufactured by Toshiba Machine Co., Ltd.) with the cylinder temperature set to 140 to 170° C. The molten P3HA composition having a temperature of 185° C. was discharged from the nozzle of the die mounted on the outlet end of the extruder, and the discharged P3HA composition was cooled with water at 43° C. The cooled composition was cut to obtain resin particles having a weight per piece of 2.0 mg. For the obtained resin particles, the melting point was 163° C. and the MFR measured at 170° C. was 2.5 g/10 min.

[Production of P3HA Foam Particles]

One hundred parts by weight of the obtained resin particles, 200 parts by weight of pure water, 1.0 parts by weight of the dispersant, 0.1 parts by weight of the dispersion aid, and 2 parts by weight of the crosslinking agent were placed into a pressure-resistant vessel under stirring, and this was followed by vacuuming to remove oxygen from the pressure-resistant vessel. Carbon dioxide as the blowing agent was then introduced into the pressure-resistant vessel. Subsequently, the contents of the pressure-resistant vessel were heated to a foaming temperature of 142.0° C. over 40 minutes. Carbon dioxide was then further introduced, and the pressure inside the pressure-resistant vessel was increased to a foaming pressure of 3.3 MPa (gauge pressure). The contents of the pressure-resistant vessel were held at around the foaming temperature and foaming pressure for 30 minutes. A valve located at a lower portion of the pressure-resistant vessel was then opened, and the contents of the pressure-resistant vessel were discharged into atmospheric pressure through an orifice with a diameter of 3.6 mm. Thus, foam particles were obtained. The time from the start of heating to the start of foaming was 70 minutes and the foam particle productivity was high. The foam particles were washed to remove the dispersant attached to the surfaces of the foam particles and then dried at 90° C. All of the 10 panelists determined that the foam particles obtained emitted no odor. The other properties of the foam particles are summarized in Table 1.

TABLE 1

| | | | Example 1 | Example 2 | Example 3 | Comp. Example 1 | Comp. Example 2 | Comp. Example 3 | Comp. Example 4 | Comp. Example 5 |
|---|---|---|---|---|---|---|---|---|---|---|
| Type of P3HA | P3HA-1 | phr | 100 | 100 | | | | | 100 | 100 |
| | P3HA-2 | | | | 100 | | | | | |
| | P3HA-3 | | | | | 100 | 100 | 100 | | |
| Composition of P3HA | P3HH3BH | wt % | 92 | 92 | 96 | 100 | 100 | 100 | 92 | 92 |
| | P3HB | | 8 | 8 | 4 | | | | 8 | 8 |
| Crosslinking agent | Crosslinking agent-1 | phr | 2 | 2 | 2 | 2 | 2 | 2 | 2 | |
| | Crosslinking agent-2 | | | | | | | | | 2 |
| Foaming step | Foaming temperature | °C. | 142.0 | 142.0 | 136.0 | 129.5 | 129.5 | 142.0 | 129.5 | 141.0 |
| | Holding time | min | 30 | 15 | 30 | 60 | 30 | 30 | 30 | 30 |
| | Time from start of heating to start of foaming | min | 70 | 55 | 70 | 100 | 70 | 70 | 70 | 70 |
| | Productivity | — | Good | Excellent | Good | Poor | Good | Very poor Foaming was infeasible | Very poor Foaming did not occur | Good |
| Foam particles | Apparent density | g/L | 71 | 72 | 70 | 71 | 68 | — | — | 68 |
| | Gel fraction | wt % | 79 | 81 | 75 | 67 | 53 | — | — | 71 |
| | Odor | — | Good | Average | Good | Good | Poor | — | — | Very poor |
| Foam molded article | Density | g/L | 48 | 50 | 46 | 48 | 46 | — | — | 45 |

[Production of P3HA Foam Molded Article]

The foam particles obtained as above were placed into a pressure-resistant vessel heated to 80° C. and were pressurized with air to attain a foam particle inner pressure of 0.18 MPa (absolute pressure). The foam particles were charged into a 370 mm-long, 320 mm-wide, 60 mm-thick mold of a molding machine (EP-900L-M5 manufactured by DAISEN Co., Ltd.). The foam particles were then heated by heated steam with a pressure of 0.15 MPa (gauge pressure) to obtain a foam molded article, which was then dried at 75° C. The density of the foam molded article obtained was 48 g/L.

Examples 2 and 3 and Comparative Examples 1 to 5

Resin particles, foam particles, and foam molded articles were produced in the same manner as in Example 1, except that the component proportions and foaming conditions were changed as shown in Table 1, and evaluations were carried out in the same manner as in Example 1. The results are summarized in Table 1.

As seen from Table 1, in Examples 1 to 3 where a mixture containing a poly(3-hydroxyalkanoate) copolymer and a poly(3-hydroxybutyrate) homopolymer at a weight ratio of 99:1 to 80:20 was used as the poly(3-hydroxyalkanoate) and an organic peroxide which is a percarbonate was used as the crosslinking agent and where the foaming temperature was in the range of 130 to 150° C., the P3HA foam particle productivity was high, and the resulting foam particles had little or no odor.

In Comparative Examples 1 and 2 where a poly(3-hydroxyalkanoate) copolymer was used alone as the poly (3-hydroxyalkanoate) and where the foaming temperature was outside the range of 130 to 150° C., foam particles were obtained but it was difficult to achieve high foam particle productivity and at the same time make the foam particles free of odor. In Comparative Example 1, the productivity was low although the foam particles had no odor. In Comparative Example 2 where the holding time was short, the foam particles had odor although the productivity was high.

In Comparative Example 3, the foaming temperature was in the range of 130 to 150° C. However, since a poly(3-hydroxyalkanoate) copolymer was used alone as the poly (3-hydroxyalkanoate), the resin particles made of the poly (3-hydroxyalkanoate) copolymer were aggregated in the pressure-resistant vessel, and foaming was infeasible.

In Comparative Example 4, a mixture containing a poly (3-hydroxyalkanoate) copolymer and a poly(3-hydroxybutyrate) homopolymer was used as the poly(3-hydroxyalkanoate). However, foam particles were not obtained since the foaming temperature was outside the range of 130 to 150° C.

In Comparative Example 5, a mixture containing a poly (3-hydroxyalkanoate) copolymer and a poly(3-hydroxybutyrate) homopolymer was used as the poly(3-hydroxyalkanoate). However, the foam particles had aromatic compound-derived odor since benzoyl peroxide rather than percarbonate was used as the crosslinking agent.

Example 4

[Production of P3HA Two-Step-Foam Particles and Foam Molded Article]

The foam particles obtained in Example 1 were placed into a pressure-resistant vessel heated to 80° C. and were pressurized with air to attain a foam particle inner pressure of 0.30 MPa (absolute pressure). Subsequently, the foam particles were heated by heated steam with a pressure of 0.04 MPa (gauge pressure) to obtain two-step-foam particles, which were then dried at 75° C. All of the 10 panelists determined that the two-step-foam particles obtained emitted no odor.

The two-step-foam particles obtained were placed into a pressure-resistant vessel heated to 80° C. and pressurized with air to attain a foam particle inner pressure of 0.18 MPa (absolute pressure). The foam particles were charged into a 370 mm-long, 320 mm-wide, 60 mm-thick mold of a molding machine (EP-900 manufactured by DAISEN Co., Ltd.). The foam particles were then heated by heated steam with a pressure of 0.15 MPa (gauge pressure) to obtain a foam molded article, which was then dried at 75° C. The density of the foam molded article obtained was 25 g/L.

As described above, it has been confirmed that by the use of the production method of the present invention, poly(3-hydroxyalkanoate) foam particles and a foam molded article having little or no odor can be produced with high productivity.

The invention claimed is:

1. A method for producing poly(3-hydroxyalkanoate) foam particles, the method comprising:
    introducing a blowing agent into an aqueous dispersion in a pressure-resistant vessel, wherein the aqueous dispersion comprises a crosslinking agent and resin particles comprising a poly(3-hydroxyalkanoate);
    heating a content of the pressure-resistant vessel after the introducing to a temperature of from 130 to 150° C. and holding the temperature for 5 to 55 minutes; and
    opening one end of the pressure-resistant vessel to discharge the content of the pressure-resistant vessel into a low-pressure atmosphere and foaming the resin particles, wherein
    the poly(3-hydroxyalkanoate) is a mixture containing a poly(3-hydroxyalkanoate) copolymer and a poly(3-hydroxybutyrate) homopolymer at a weight ratio of from 99:1 to 80:20, and
    the crosslinking agent is a percarbonate.

2. The method according to claim 1, wherein the blowing agent is carbon dioxide.

3. The method according to claim 1, wherein
    the poly(3-hydroxyalkanoate) copolymer is a copolymer of 3-hydroxybutyrate and a comonomer, and
    a 3-hydroxybutyrate/comonomer ratio in the copolymer is from 99/1 to 89/11 mol %/mol %.

4. The method according to claim 1, wherein the percarbonate has a 1 minute half-life temperature of from 150 to 170° C. and is liquid at room temperature.

5. The method according to claim 4, wherein the percarbonate is a compound having one carbonate group.

6. The method according to claim 1, further comprising, after the foaming of the resin particles, impregnating resulting foam particles with an inorganic gas to increase a pressure inside the foam particles and subsequently heating the foam particles to expand the foam particles.

7. A method for producing a poly(3-hydroxyalkanoate) foam molded article, the method comprising:
    producing poly(3-hydroxyalkanoate) foam particles by the method according to claim 1; and
    heating and molding the foam particles in a mold.

8. The method according to claim 1, wherein the weight ratio of the poly(3-hydroxyalkanoate) copolymer and the poly(3-hydroxybutyrate) homopolymer is from 98:2 to 84:16.

9. The method according to claim 1, wherein the weight ratio of the poly(3-hydroxyalkanoate) copolymer and the poly(3-hydroxybutyrate) homopolymer is from 97:3 to 88:12.

10. The method according to claim 1, wherein the aqueous dispersion comprises a dispersant and an amount of the dispersant is from 0.1 to 3.0 parts by weight per 100 parts by weight of the resin particles comprising the poly(3-hydroxyalkanoate).

11. The method according to claim 10, wherein the dispersant is at least one selected from the group consisting of tricalcium phosphate, trimagnesium phosphate, basic magnesium carbonate, calcium carbonate, barium sulfate, kaolin, talc, clay, aluminum oxide, titanium oxide, and aluminum hydroxide.

12. The method according to claim 1, wherein the aqueous dispersion comprises a dispersion aid, wherein an amount of the dispersant aid is from 0.001 to 0.5 parts by weight per 100 parts by weight of the resin particles comprising the poly(3-hydroxyalkanoate).

13. The method according to claim 1, wherein an amount of the crosslinking agent is from 1.2 to 5 parts by weight per 100 parts by weight of the resin particles comprising the poly(3-hydroxyalkanoate).

14. The method according to claim 1, wherein an amount of the crosslinking agent is from 1.3 to 4 parts by weight per 100 parts by weight of the resin particles comprising the poly(3-hydroxyalkanoate).

15. The method according to claim 4, wherein an amount of the crosslinking agent is from 1.2 to 5 parts by weight per 100 parts by weight of the resin particles comprising the poly(3-hydroxyalkanoate).

16. The method according to claim 4, wherein an amount of the crosslinking agent is from 1.3 to 4 parts by weight per 100 parts by weight of the resin particles comprising the poly(3-hydroxyalkanoate).

17. The method according to claim 1, wherein the percarbonate is at least one selected from the group consisting of t-butylperoxy-2-ethylhexyl monocarbonate, t-butylperoxyisopropyl monocarbonate, t-amylperoxy-2-ethylhexyl monocarbonate, and t-amylperoxyisopropyl monocarbonate.

18. The method according to claim 3, wherein the 3-hydroxybutyrate/comonomer ratio in the copolymer is from 97/3 to 91/9 mol %/mol %.

19. The method according to claim 1, wherein the blowing agent is at least one selected from the group consisting of carbon dioxide, nitrogen, air, a saturated hydrocarbon having 3 to 5 carbon atoms, a dimethyl ether, diethyl ether, methyl ethyl ether, monochloromethane, dichloromethane, dichlorodifluoroethane, and water.

20. The method according to claim 19, wherein an amount of the blowing agent is from 2 to 10000 parts by weigh per 100 parts by weight of the resin particles comprising the poly(3-hydroxyalkanoate).

* * * * *